(12) United States Patent
Andrews et al.

(10) Patent No.: US 7,188,543 B1
(45) Date of Patent: Mar. 13, 2007

(54) GEAR AND BEARING MECHANISM FOR IMPROVED EASE OF ASSEMBLY WITHIN A GEARCASE

(75) Inventors: Jeffrey J. Andrews, Fond du Lac, WI (US); Robert B. Weronke, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 469 days.

(21) Appl. No.: 10/721,840

(22) Filed: Nov. 25, 2003

(51) Int. Cl.
*F16H 55/00* (2006.01)
(52) U.S. Cl. ..................... 74/431; 74/606 R
(58) Field of Classification Search .............. 384/906; 74/417, 423, 606 R, 412 R, 416, 421 R, 74/431
See application file for complete search history.

(56) References Cited

U.S. PATENT DOCUMENTS

| | | | | |
|---|---|---|---|---|
| 2,631,069 A | * | 3/1953 | Starr | 384/439 |
| 4,373,922 A | | 2/1983 | Weed | 440/89 |
| 4,685,172 A | * | 8/1987 | O'Connor | 16/2.1 |
| 4,897,058 A | | 1/1990 | McCormick | 440/80 |
| 4,986,775 A | | 1/1991 | Wantz | 440/83 |
| 5,070,745 A | * | 12/1991 | Lindsey et al. | 74/665 GB |
| 5,080,501 A | * | 1/1992 | Siebert et al. | 384/537 |
| 5,188,324 A | * | 2/1993 | Joseph et al. | 248/222.52 |
| 5,511,885 A | * | 4/1996 | Coleman | 384/439 |
| 5,538,349 A | * | 7/1996 | Morris et al. | 384/585 |
| 6,467,965 B1 | * | 10/2002 | Wyer | 384/295 |

* cited by examiner

*Primary Examiner*—Thomas R. Hannon
*Assistant Examiner*—Justin Krause
(74) *Attorney, Agent, or Firm*—William D. Lanyi

(57) ABSTRACT

A retaining member is provided and attached to a bevel gear in order to allow the bevel gear to be attached, prior to assembly, to a bearing adapter. The retaining member is provided with first and second protuberances that extend radially outwardly from diametrically opposite positions on the retaining member so that the protuberances can be inserted through first and second slots in a generally cylindrical member, or bearing adapter, during the assembly of individual components to form a subassembly. Since the bearing adapter is attached to a bearing carrier, misalignment of the protuberances and the slots allow the bevel gear and several other assorted components to be retained in contact with the bearing carrier so that the components are not free to move in axial directions away from each other to allow separation of these components. Since the individual components are retained in axial positions relative to each other and relative to the bearing carrier, insertion of this subassembly into a gearcase makes the assembly much easier than would otherwise be possible.

19 Claims, 4 Drawing Sheets

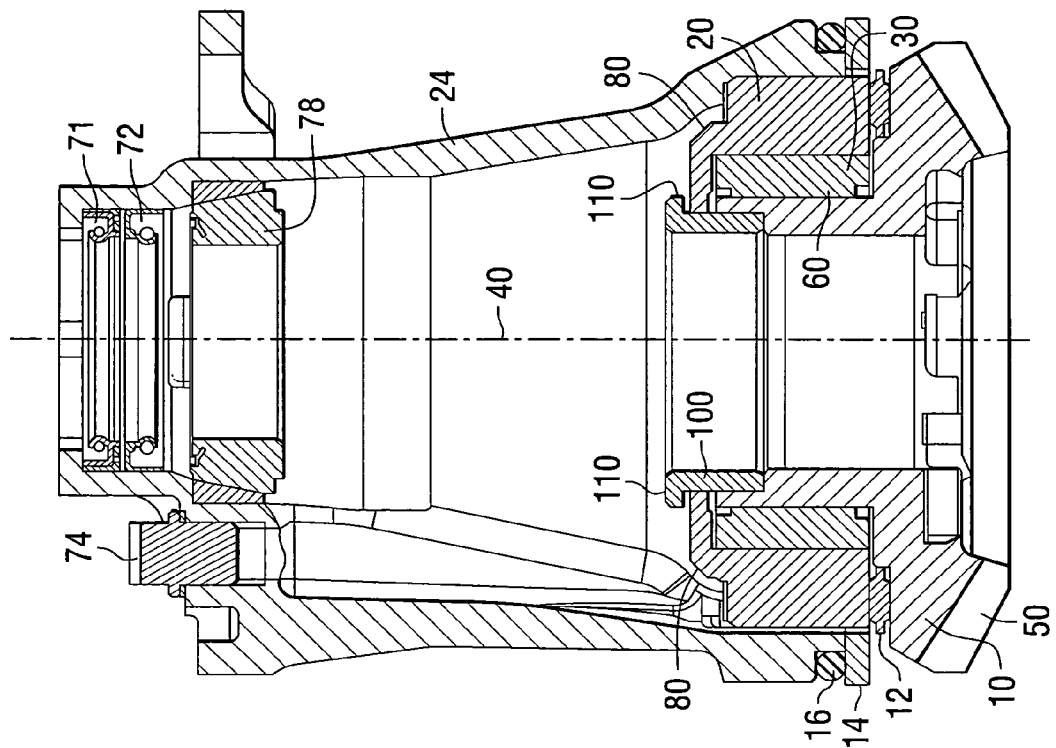
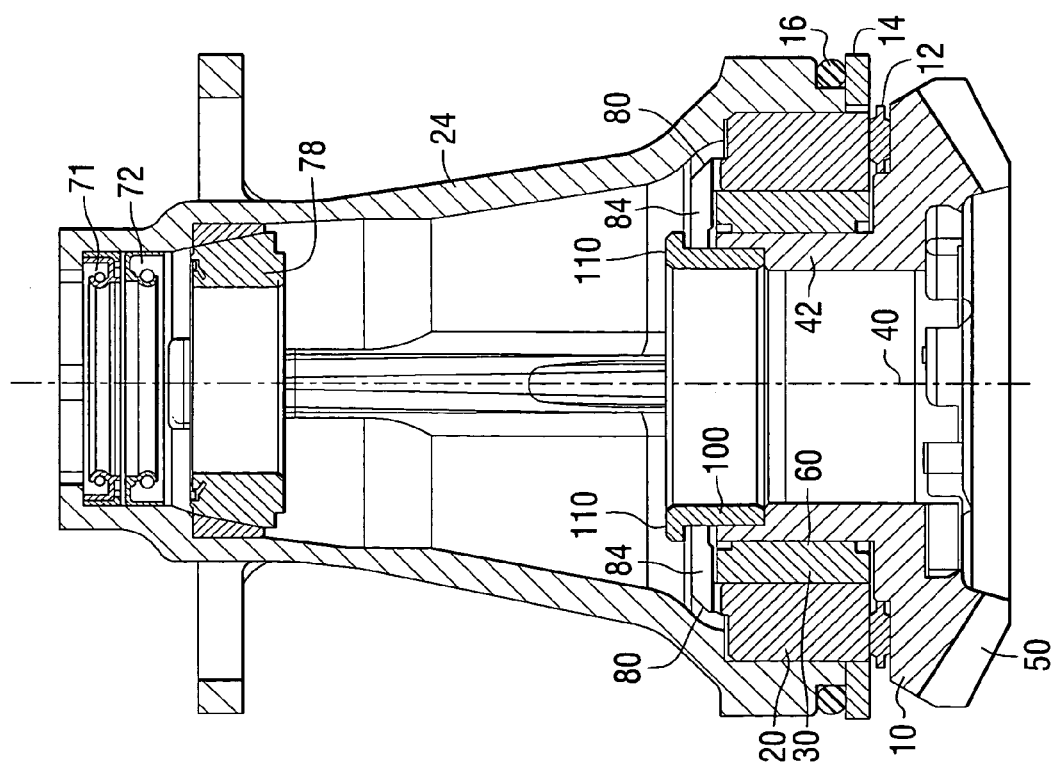

GEAR AND BEARING MECHANISM FOR IMPROVED EASE OF ASSEMBLY WITHIN A GEARCASE

BACKGROUND OF THE INVENTION

1. Field of the Invention

The present invention relates generally to a structure of gears and bearings and, more particularly, to a particular structure relating to a bevel gear and a bearing adaptor which facilitates the manual assembly of the bevel gear and related thrust and roller bearings into a gearcase in combination with a bearing carrier assembly.

2. Description of the Prior Art

Those skilled in the art of marine propulsion systems are familiar with various types of gear and bearing structures contained within the gearcase of a marine propulsion system. Certain marine propulsion systems are provided with a gearcase internal assembly that is particularly configured to suit an opposite rotation of the propeller shaft. As an example, when two outboard motors are provided for use in a tandem operation on a single marine vessel, the gearing associated with the propeller shafts are selected and constructed to rotate in opposite directions. This technique is well known to those skilled in the art of marine propulsion systems. Because of the thrust forces resulting from the opposite rotation of the propeller and its shaft, the bearing arrangement in an opposite rotation marine propulsion system is designed differently than in a marine propulsion system with a conventionally rotating propeller shaft. These reverse rotating marine propulsion systems are sometimes referred to as "left hand" systems.

In a gearcase for an oppositely rotating propeller shaft, the bearing carrier assembly is provided with a clearance fit between the gear hub and the roller bearings. During assembly of the components into the gearcase, the bevel gear can slide out of the bearing carrier assembly because of this clearance fit and because the subassemblies are typically assembled in a direction with the axis of rotation of the bevel gears being vertical. This vertical assembly technique typically places the forward gear on the bottom of the subassembly with the bearing carrier above it. As a result of gravity and the clearance fit between the gear hub and the rollers, the bevel gear can easily separate from the bearing carrier during the assembly procedure. As a result, the assembly of the components into a gearcase for an opposite rotation marine propulsion system can be extremely difficult. Assembling the bevel gear into the other components of the bearing carrier requires precise alignment with numerous loose bearings, thrust rings, and O-rings being retained in a precise location as the components are fitted together. This difficult assembly and alignment of components increases the time necessary to assemble the marine propulsion system and, as a result, increases its cost and the likelihood that the components can be misassembled.

Various types of gearcase mechanisms and assemblies are known to those skilled in the art of marine propulsion systems.

U.S. Pat. No. 4,986,775, which issued to Wantz on Jan. 22, 1991, discloses a propeller shaft bidirectional thrust bearing system. The system for the propeller shaft of a marine propulsion system includes a substantially circumferential groove milled into the propeller shaft. A pair of substantially semicircular force transferring members are adapted for placement within the groove and front and rear bearing collars are placed adjacent the force transferring members. Front and rear needle bearings are provided adjacent the front and rear bearing collars, respectively. A front bearing adaptor, interconnected with the walls of the cavity within which the propeller shaft is disposed, transfers forward thrust to the propeller shaft in the gearcase. A rear bearing carrier, held in position by means of a ring nut mounted within the cavity, serves to transfer rearward thrust in the propeller shaft to the gearcase.

U.S. Pat. No. 4,897,058 which issued to McCormick on Jan. 30, 1990, discloses a marine device with an improved propeller shaft bearing carrier arrangement. A marine drive for a boat includes a construction wherein a propeller supporting bearing sleeve is disposed in a recess inside the propeller hub. A bearing carrier is concentrically associated with a propeller shaft. The carrier is provided with a rearwardly extending nose portion which is telescoped within the forwardly facing recess in an adjacent rearward propeller hub. The propeller shaft is journaled in the bearing device which is disposed between the carrier and the shaft and within the recess. In one aspect of the invention, the carrier is prevented from rotating about the shaft access. In another aspect, a sealing device is disposed between the propeller shaft and the rear end portion of an adjacent supporting gearcase. In the embodiment disclosed in this patent, dual propellers and dual bearing carriers are utilized, with bearing carrier noses disposed in recesses in both propeller hubs.

U.S. Pat. No. 4,373,922, which issued to Weed on Feb. 15, 1983, discloses an outboard propulsion gearcase. An outboard drive unit for a watercraft with a through-the-propeller hub exhaust system for engine exhaust has a bearing support member which carries the propeller shaft and separates the exhaust passages from the propeller shaft gears. Lubricant retaining surfaces are formed on the bearing support member to prevent corrosion between the support member and the housing.

The patents described above are hereby expressly incorporated by reference in the description of the present invention.

Although some of the specific components and structures within the gearcase of a marine propulsion system can vary from one design to another, the basic structure incorporates the same types of components. The patents described above, illustrate three examples of a gearcase structure. For example, U.S. Pat. No. 4,986,775 shows the arrangement of a bearing carrier in conjunction with thrust bearings and bevel gears for the purpose of providing a transmission for the marine propulsion system. Two bevel gears are usually provided, in opposing directions, which are continuously engaged with a bevel gear that is attached to a driveshaft. By selectively engaging either a forward or reverse bevel gear into driving relation with the propeller shaft, forward or reverse direction can be selected by the operator of a marine vessel. Thus, with a constant direction of rotation of the driveshaft, the selection of the forward or reverse bevel gears will cause the rotation of the propeller shaft to change in accordance with the position of a dog clutch that is movable by the operator of the marine vessel. When neither of the two bevel gears is engaged with the propeller shaft, the transmission is placed in a neutral gear position.

The basic structure of the gears and bearings within a gearcase are generally known to those skilled in the art and will not be described in significant detail below other than is necessary to describe the present invention. The structure of the internal components of a gearcase for a marine propulsion system can be significantly improved if the configuration of the components can be made to facilitate the assembly of the components into a gearcase housing, particularly in conjunction with an oppositely rotating propeller shaft.

SUMMARY OF THE INVENTION

A mechanism for a marine propulsion system, made in accordance with the preferred embodiment of the present invention, comprises a gear member having an axis of rotation and a generally cylindrical member having a first slot formed therein. A retaining member is attached to the gear member and is provided with a first protuberance shaped to pass through the first slot of the generally cylindrical member and moved into interfering relation with the generally cylindrical member in response to rotation of the gear member about the axis of rotation. As a result, the gear member is retained axially relative to the generally cylindrical member when the first protuberance is not aligned with the first slot, but the gear member is free to rotate and to move axially away from the generally cylindrical member when the first protuberance is aligned with the first slot.

The present invention further comprises a bearing carrier to which the generally cylindrical member can be attached. The generally cylindrical member, in a preferred embodiment of the present invention, is a bearing adapter and a roller bearing assembly is attached to the bearing adapter. A thrust bearing can be disposed between the gear member and the generally cylindrical member. The thrust bearing is generally concentric with the axis of rotation. A thrust ring and a seal ring are disposed between the gear member and the generally cylindrical member. The thrust ring and the seal ring are generally concentric with the axis of rotation.

In a particularly preferred embodiment of the present invention, the generally cylindrical member has first and second slots formed therein and the retaining member has first and second protuberances which are shaped to pass through the first and second slots, respectively, and move into interfering relation with the generally cylindrical member in response to rotation of the gear member about the axis of rotation. The first and second protuberances are disposed at diametrically opposite positions on the retaining member and the first and second slots are disposed at diametrically opposite positions on the generally cylindrical member. In a preferred embodiment, the gear member is a bevel gear.

BRIEF DESCRIPTION OF THE DRAWINGS

The present invention will be more fully and completely understood from a reading of the description of the preferred embodiment in conjunction with the drawings, in which:

FIGS. 4 and 5 are two sectional views of the present invention.

DESCRIPTION OF THE PREFERRED EMBODIMENT

Figure 1:
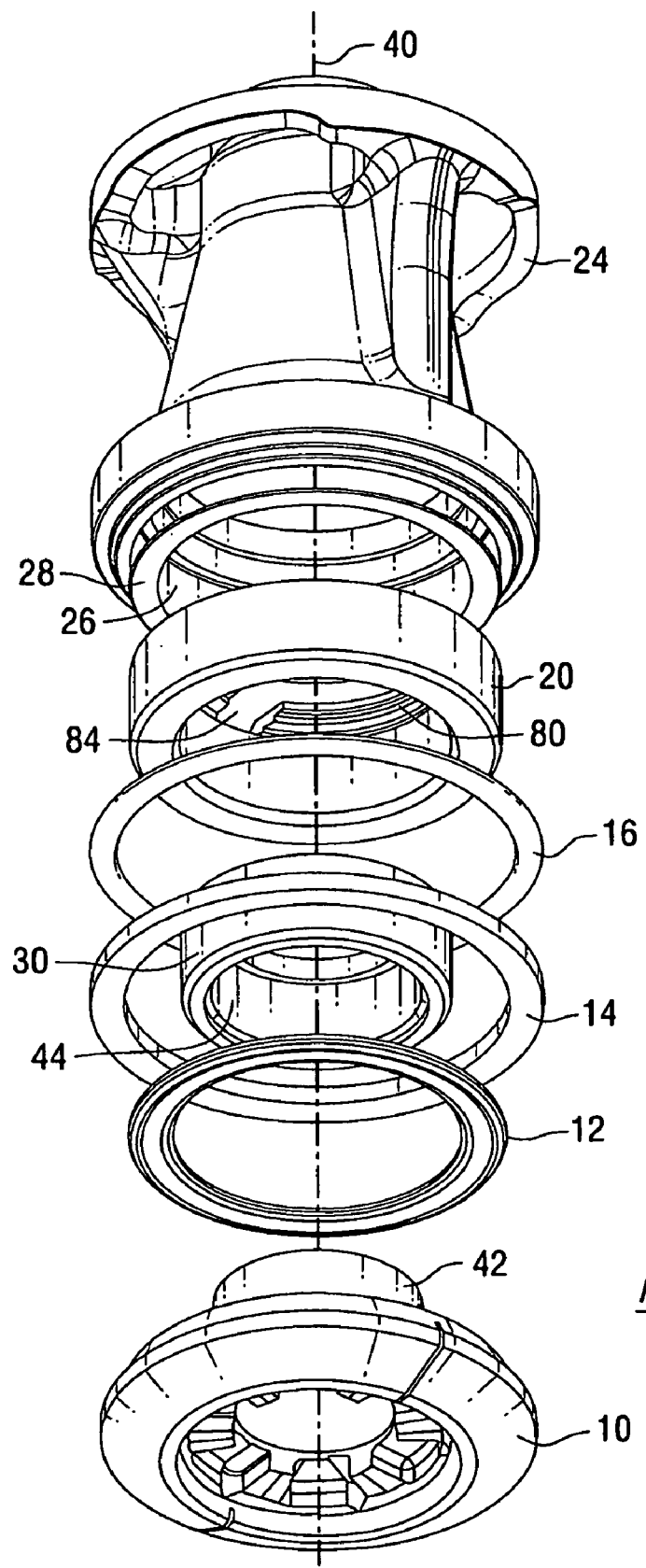
FIG. 1 is an exploded view of a gear and bearing arrangement known to those skilled in the art.

Throughout the description of the preferred embodiment of the present invention, like components will be identified by like reference numerals.

Before describing the concepts of the present invention, it is helpful to understand how the internal structure of a gearcase is constructed in known types of reverse rotation systems.

FIG. 1 is an isometric exploded view of an assembly of components that are inserted into the gearcase of a marine propulsion system in systems which are intended for reverse rotation. It should be understood that most marine propulsion systems, by convention, have propeller shafts that rotate in a clockwise direction when in forward gear and when viewed from a position behind the propeller. When two marine propulsion systems are used on a common marine vessel, one of the marine propulsion systems is designed to rotate in an opposite direction for the purpose of balancing propeller reacting moments so that the use of two marine propulsion systems does not adversely affect the operation of the marine vessel. It should be understood that the present invention is particularly useful during the assembly of the components for an opposite rotation system, but it is not restricted to this specific use.

With continued reference to FIG. 1, a forward gear 10 for an opposite rotation system is provided with a thrust bearing 12 and a thrust ring 14, or thrust collar. An O-ring 16 is provided as a seal ring. A bearing adapter 20, or generally cylindrical member, is attached to a bearing carrier 24. The bearing adapter 20 is disposed in an opening 26 of the bearing carrier 24 with an interference fit relationship. A shim 28 is provided to axially position the bearing adapter 20 relative to the bearing carrier 24. A roller bearing assembly 30 is pressed into the bearing adapter 20.

With continued reference to FIG. 1, it should be understood that the components shown in FIG. 1 are assembled into a gearcase in the direction represented in the illustration. In other words, the gearcase is turned to a position that will accept the bevel gear 10 in a downwardly moving direction prior to the other components shown in FIG. 1. After the bevel gear 10 is located in the gearcase, the thrust bearing 12, thrust ring 14 and the O-ring 16 are placed in the gearcase above the bevel gear 10. The bearing adapter 20, with its roller bearing 30 inserted within it, is pressed into the bearing carrier 24 prior to assembly into the gearcase. As a subassembly, the bearing carrier 24, the bearing adapter 20, and the roller bearing 30 are then moved downwardly into the gearcase, in a direction generally parallel to axis 40, and fitted to the existing position of the bevel gear 10. This requires the generally cylindrical portion 42 of the bevel gear 10 to pass into the internal cylindrical opening 44 of the roller bearing assembly 30. During this assembly procedure, the thrust bearing 12, the thrust ring 14, and the O-ring 16 can easily be moved out of their proper locations which are concentric with axis 40. The assembly of these components shown in FIG. 1 can result in an excessively difficult process which takes excessive time and which can frequently result in a misalignment of the individual components.

Figure 2:
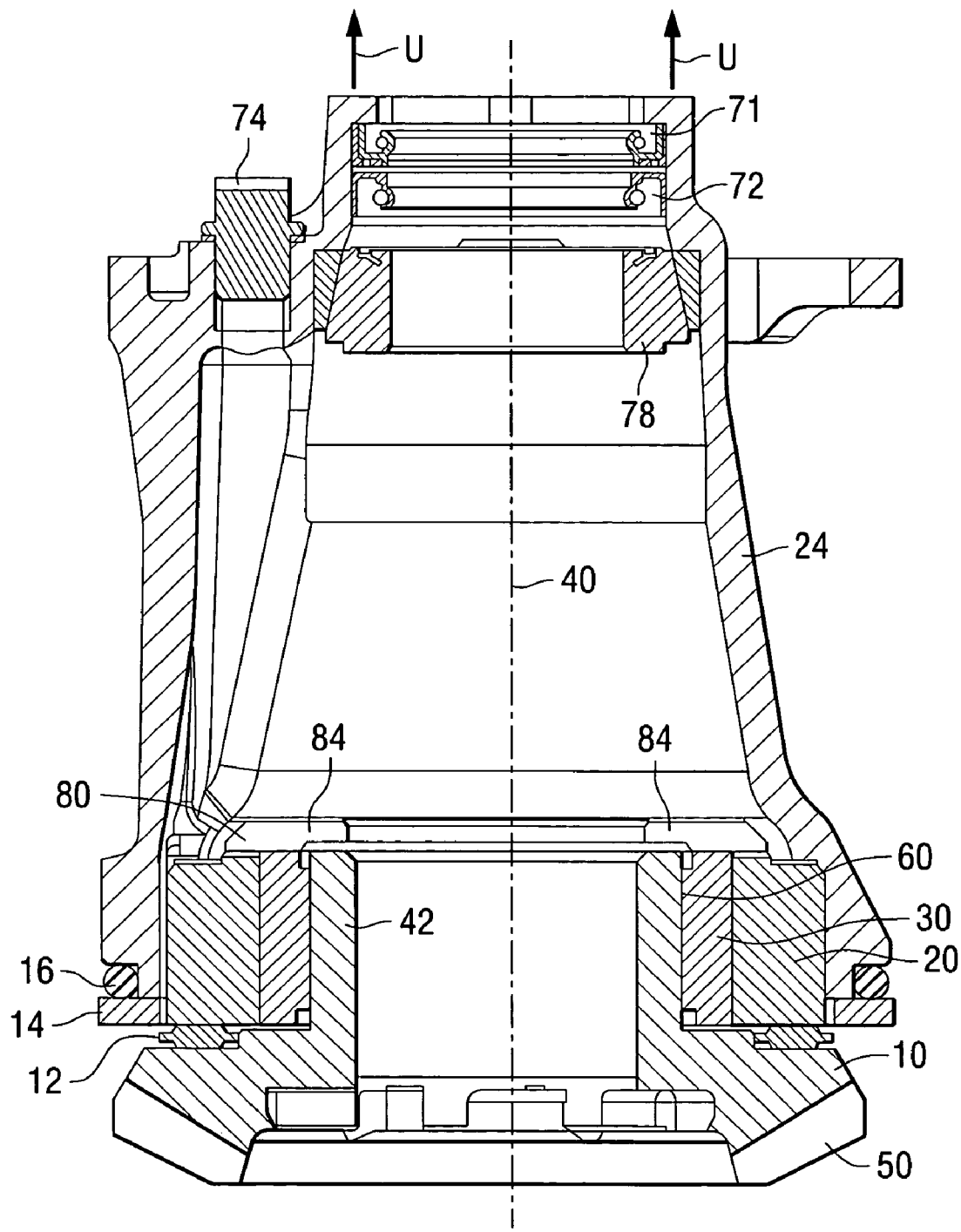
FIG. 2 is a section view of an assembled version of the components shown in FIG. 1.

FIG. 2 is a section view of the components shown in FIG. 1 after they are assembled together. At the bottom of the assembly is the bevel gear 10. It should be understood that the bevel gear 10 is shown with its teeth 50 which, for simplicity, were not illustrated on the bevel gear 10 in FIG. 1.

Also shown in FIG. 2 is the thrust bearing 12 and its associated thrust ring 14. The O-ring 16 provides a seal between the bearing carrier 24 and the thrust ring 14. The bearing adapter 20 is attached to the bearing carrier 24 with an interference fit and the lower bearing assembly 30, with its roller bearings 60 located radially inward from the roller bearing structure 30, disposed radially inwardly from the bearing adapter 20. Although the roller bearings are not specifically shown in the Figures, reference numeral 60 shows where they are relative to the roller bearing assembly 30. The bearings 60 are located radially inward from the main structure of the roller bearing assembly 30. The roller bearings 60 are disposed in rolling contact with the outer cylindrical surface of the cylindrical portion 42 of the bevel gear 10.

Also shown in FIG. 2 are two seals 71 and 72 and a drain plug 74. These components, in addition to the tapered roller bearing 78, are contained within the bearing carrier 24, but do not relate directly to the advantages provided by the present invention.

With reference to FIGS. 1 and 2, it should be understood that the bearing adaptor 20 has an upwardly positioned portion 80 that also extends radially inward from the generally cylindrical portion of the structure. This upper portion 80 is provided with two slots 84 that are used by a bearing removal tool in a manner that is generally known to those skilled in the art.

In order to understand the problem for which the present invention provides a solution, it is necessary to understand that the structure shown in FIG. 2 would axially separate when the bearing carrier 24 is lifted upwardly relative to the bevel gear 10. In other words, if the bearing carrier 24 was moved in a direction identified by arrows U, which is generally parallel to the central axis 40, the bearing adapter 20 and roller bearing assembly 30 would move upwardly with the bearing carrier 24 because of the interference fits between these components. However, the roller bearing assembly 30 and its roller bearing 60 would also move upwardly relative to the cylindrical portion 42 of the bevel gear 10. As a result, the thrust bearing 12, the thrust collar 14, and probably the O-ring 16, would remain with the bevel gear 10 as the bearing carrier 24 is moved upwardly in the direction of arrows U. Reversing this procedure, it can be seen that an attempt to preassemble the components shown in FIG. 2 prior to inserting the subassembly into the gearcase of a marine propulsion system would not be easily successful because of the tendency of the bevel gear 10, thrust bearing 12, thrust collar 14, and O-ring 16 to fall downwardly away from the bearing carrier 24 as this assembly or insertion into the gearcase is attempted. The present invention is directed to solving this problem of assembly.

Figure 3:
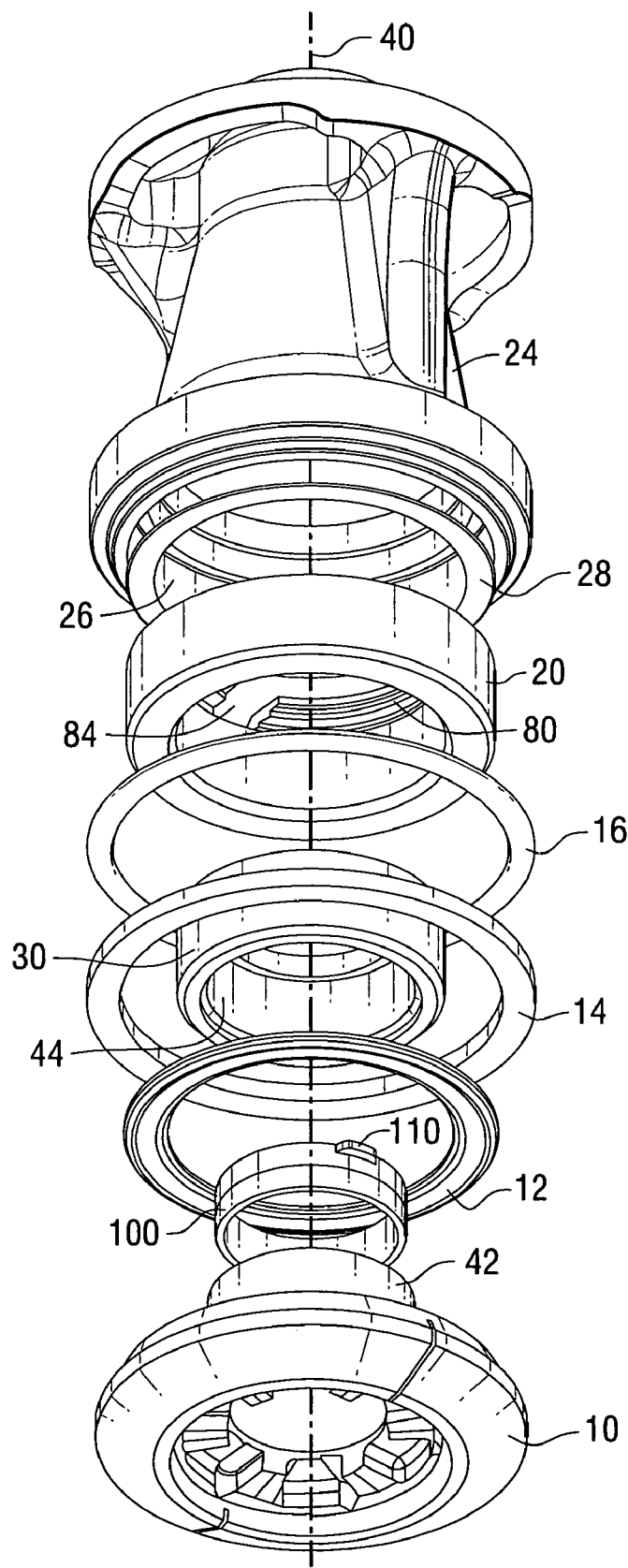
FIG. 3 is an exploded view of the components made in accordance with the present invention.

FIG. 3 is an isometric exploded view showing a structure made in accordance with the present invention. As described above, the bevel gear 10, with its cylindrical portion 42, thrust bearing 12, thrust collar 14, and O-ring 16 are generally similar to those associated components described above in conjunction with FIGS. 1 and 2. Similarly, the bearing carrier 24, the shim 28, and the bearing adapter 20 are generally similar those described above in conjunction with FIGS. 1 and 2. The present invention, however, provides a retaining member 100 that is insertable into the inner cylindrical cavity of the cylindrical portion 42 of the bevel gear 10. In a preferred embodiment, the retaining member 100 is press fit into this cylindrical surface of the cylindrical portion 42. The retaining member 100 is provided with first and second protuberances 110 (only one protuberance 110 is visible in FIG. 3) which can be aligned with first and second slots 84 in the bearing adapter 20 (only one slot 84 is visible in FIG. 3). This allows the components shown in FIG. 3 to be assembled together as a subassembly, with the protuberances 110 passing through the slots 84 in a vertical direction to allow the components to be aligned and assembled prior to insertion into the gearcase. Then, by rotating the bearing carrier 24 slightly about the axis of rotation 40, the protuberances 110 and slots 84 can be misaligned so as to prevent axial movement of the bevel gear 10 relative to the bearing adapter 20 and bearing carrier 24. This locks the component shown in FIG. 3 into a single subassembly which allows that subassembly to be easily lowered into a gearcase as an integral unit and assembled with the other components in the gearcase.

FIGS. 4 and 5 are section views of the present invention in two different stages of assembly. In FIG. 4, the first and second protuberances 110 are aligned with the first and second slots 84 in the upper portion 80 of the bearing adapter 20. When positioned as shown in FIG. 4, the first and second protuberances 110 can move upwardly or downwardly through the first and second slots 84 to place the bevel gear 10 upwardly relative to the bearing carrier 24 in order to achieve the arrangement of components shown in FIG. 4. After this arrangement is achieved, the bearing carrier 24 can be rotated about the axis of rotation 40 relative to the bearing adapter 20 to place the first and second protuberances 110 into interfering relation with the upper portion 80 of the bearing adapter 20. This retains the bevel gear 10, the thrust bearing 12, the thrust collar 14, and the O-ring 16 in their positions axially relative to the bearing carrier 24. In other words, when in the position shown in FIG. 5, the first and second protuberances 110 cannot pass downwardly because of the misalignment of those protuberances with the first and second slots 84 described above in conjunction with FIG. 4. As a result, the assembly shown in FIG. 5 is attached together as a subassembly that can be more easily lowered into the gearcase for purposes of assembling the bevel gear 10, which is a forward gear, with the bevel gear which is attached to the driveshaft as described above. The individual components of the subassembly shown in FIG. 3 cannot move relative to each other axially in a direction parallel to the axis of rotation 40. As a result, they cannot separate from each other and can therefore be assembled as a subassembly rather than as individual components in the manner generally known to those skilled in the art.

With reference to FIGS. 3, 4, and 5, it can been seen that the mechanism for a marine propulsion system made in accordance with the preferred embodiment of the present invention, comprises a gear member 10 having an axis of rotation 40 and a generally cylindrical member 20, or bearing adapter, having first and second slots 84 formed therein. A retaining member 100 is attached to the gear member 10 and is provided with first and second protuberances 110 which are shaped to pass through the first and second slots 84 and move into interfering relation with the bearing adapter 20, or generally cylindrical member, in response to rotation of the gear member 10 about the axis of rotation 40. As a result, the gear member 10 is retained axially relative to the generally cylindrical member 20 when the first and second protuberances 110 are not aligned with the first and second slots 84, but the gear member 10 is free to move axially away from the generally cylindrical member 20 when the first and second protuberances 110 are aligned with the first and second slots 84. A bearing carrier 24 is attached to the generally cylindrical member 20 and, as described above, the generally cylindrical member 20 is a bearing adapter in the preferred embodiment of the present invention. A roller bearing assembly 30, with roller bearing 60, is attached to the bearing adapter 20. A thrust bearing 12 is disposed between the gear member 10 and the generally cylindrical member 20, with the thrust bearing 12 being generally concentric with the axis of rotation 40. A thrust ring 14 and a seal ring 16, such as the O-ring, are disposed between the gear member 10 and the generally cylindrical member 20, with the thrust ring and seal ring being generally concentric with the axis of rotation 40. In a particularly preferred embodiment of the present invention, the first and second protuberances 100 are disposed at diametrically opposite positions on the retaining member 100. Similarly, the first and second slots 84 are disposed at diametrically opposite positions on the generally cylindrical member 20.

Although the present invention has been described in particular detail and illustrated to show a preferred embodiment, it should be understood that alternative embodiments are also within its scope.

We claim:

1. A mechanism for a marine propulsion system, comprising:
   a gear member having an axis of rotation;
   a generally cylindrical member having a first slot formed therein;
   a retaining member attached to said gear member, said retaining member having a first protuberance shaped to pass through said first slot and move into interfering relation with said generally cylindrical member in response to rotation of said gear member about said axis of rotation, whereby said gear member is retained axially relative to said generally cylindrical member when said first protuberance is not aligned with said first slot and said gear member is free to move axially away from said generally cylindrical member when said first protuberance is aligned with said first slot;
   a bearing engaged between said gear member and said generally cylindrical member and permitting rotation of said gear member and of said retaining member about said axis relative to said generally cylindrical member.

2. The mechanism of claim 1, wherein:
   said generally cylindrical member is a bearing adaptor.

3. The mechanism of claim 1, further comprising:
   a thrust bearing disposed between said gear member and said generally cylindrical member, said thrust bearing being generally concentric with said axis of rotation, said thrust bearing having a first axial face axially facing and engaging said gear member, and a second distally oppositely facing axial face axially facing and engaging said generally cylindrical member.

4. The mechanism of claim 1, further comprising:
   a thrust ring and a seal ring disposed between said gear member and said generally cylindrical member, said thrust ring and seal ring being generally concentric with said axis of rotation.

5. The mechanism of claim 1, wherein:
   said generally cylindrical member has a second slot formed therein.

6. The mechanism of claim 5, wherein:
   said retaining member has a second protuberance shaped to pass through said second slot and move into interfering relation with said generally cylindrical member in response to rotation of said gear member about said axis of rotation.

7. The mechanism of claim 6, wherein:
   said first and second protuberances are disposed at diametrically opposite positions on said retaining member.

8. The mechanism of claim 5, wherein:
   said first and second slots are disposed at diametrically opposite positions on said generally cylindrical member.

9. The mechanism of claim 8, wherein:
   said gear member is a bevel gear.

10. The mechanism of claim 1, wherein said retaining member and said first protuberance are fixed relative to said gear member.

11. The mechanism of claim 1, wherein said bearing extends axially to an axial end, said protuberance and said slot extend along a radial projection bridging between said generally cylindrical member and said retaining member axially beyond said axial end of said bearing, said radial bridging projection being axially aligned with said bearing and axially facing and axially spaced from said axial end of said bearing.

12. A mechanism for a marine propulsion system, comprising:
    a gear member having an axis of rotation;
    a generally cylindrical member having a first slot formed therein;
    a retaining member attached to said gear member, said retaining member having a first protuberance shaped to pass through said first slot and move into interfering relation with said generally cylindrical member in response to rotation of said gear member about said axis of rotation, whereby said gear member is retained axially relative to said generally cylindrical member when said first protuberance is not aligned with said first slot and said gear member is free to move axially away from said generally cylindrical member when said first protuberance is aligned with said first slot;
    a bearing carrier, said generally cylindrical member being attached to said bearing carrier;
    a bearing engaged between said gear member and said generally cylindrical member and permitting rotation of said gear member and of said retaining member about said axis relative to said generally cylindrical member.

13. The mechanism of claim 12, further comprising:
    a thrust bearing disposed between said gear member and said generally cylindrical member, said thrust bearing being generally concentric with said axis of rotation.

14. The mechanism of claim 13, wherein:
    said generally cylindrical member has a second slot formed therein.

15. The mechanism of claim 14, wherein:
    said retaining member has a second protuberance shaped to pass through said second slot and move into interfering relation with said generally cylindrical member in response to rotation of said gear member about said axis of rotation.

16. The mechanism of claim 15, wherein:
    said first and second protuberances are disposed at diametrically opposite positions on said retaining member; and
    said first and second slots are disposed at diametrically opposite positions on said generally cylindrical member.

17. The mechanism of claim 16, wherein:
    said gear member is a bevel gear.

18. A mechanism for a marine propulsion system, comprising:
    a bevel gear having an axis of rotation;
    a generally cylindrical bearing adaptor having a first slot and a second slot formed therein;
    a retaining member attached to said bevel gear, said retaining member having a first protuberance shaped to pass through said first slot and move into interfering relation with said generally cylindrical bearing adaptor in response to rotation of said bevel gear about said axis of rotation, whereby said bevel gear is retained axially relative to said generally cylindrical bearing adaptor when said first protuberance is not aligned with said first slot and said bevel gear is free to move axially away from said generally cylindrical bearing adaptor when said first protuberance is aligned with said first slot, said retaining member having a second protuberance shaped to pass through said second slot and move into interfering relation with said generally cylindrical bearing adaptor in response to rotation of said bevel gear about said axis of rotation;

a bearing engaged between said bevel gear and said generally cylindrical bearing adapter and permitting rotation of said bevel gear and of said retaining member about said axis relative to said generally cylindrical bearing adapter.

19. The mechanism of claim 18, further comprising:

a bearing carrier, said generally cylindrical bearing adaptor being attached to said bearing carrier;

said bearing comprising a roller bearing assembly attached to said bearing adaptor;

a thrust bearing disposed between said bevel gear and said generally cylindrical bearing adaptor, said thrust bearing being generally concentric with said axis of rotation, said thrust bearing having a first axial face axially facing and engaging said gear member, and a second distally oppositely facing axial face axially facing and engaging said generally cylindrical member; and a thrust ring and a seal ring disposed between said bevel gear and said generally cylindrical bearing adaptor, said thrust ring and seal ring being generally concentric with said axis of rotation, said first and second protuberances being disposed at diametrically opposite positions on said retaining member, said first and second slots being disposed at diametrically opposite positions on said generally cylindrical bearing adaptor.

* * * * *